United States Patent [19]

Mori et al.

[11] 4,302,759
[45] Nov. 24, 1981

[54] RADIO DIRECTION FINDER
[75] Inventors: Kenzo Mori; Hyo Yasuda, both of Tokyo, Japan
[73] Assignee: Taiyo Musen Co. Ltd., Tokyo, Japan
[21] Appl. No.: 64,872
[22] Filed: Aug. 8, 1979
[51] Int. Cl.³ .............................................. G01S 5/04
[52] U.S. Cl. .................................................. 343/121
[58] Field of Search ............ 343/119, 121, 123, 113 R
[56] References Cited
U.S. PATENT DOCUMENTS 2,943,323  6/1960  Ryan ................................... 343/121
3,553,699  1/1971  Starkey et al. ..................... 343/121

Primary Examiner—Theodore M. Blum
Attorney, Agent, or Firm—A. W. Breiner

[57] ABSTRACT

A radio direction finder, designed to determine the direction of arrival of radio waves utilizing a nondirectional antenna and a plurality of directional antennas having respective directivities, comprises an oscillator for producing A.C. signals having a phase angle in correspondence to the configuration of each of the directional antennas, modulators for modulating the respective outputs of the directional antennas with respective A.C. signals, a additive circuit for superimposing the respective modulation outputs on the phase-shifted output of the nondirectional antenna, and a receiving circuit for demodulating the added output of the additive circuit to recover the A.C. signals. The radio direction finder is further characterized by an automatic phase tracking counter for following the phase of the output of the receiving circuit, and a display unit for displaying the bearing of the received radio wave numerically. Special circuitry is provided for achieving accelerated automatic phase tracking, for stopping the automatic phase tracking procedure upon the occurrence of certain disturbances, and for restarting the procedure upon disappearance of the disturbances.

7 Claims, 7 Drawing Figures

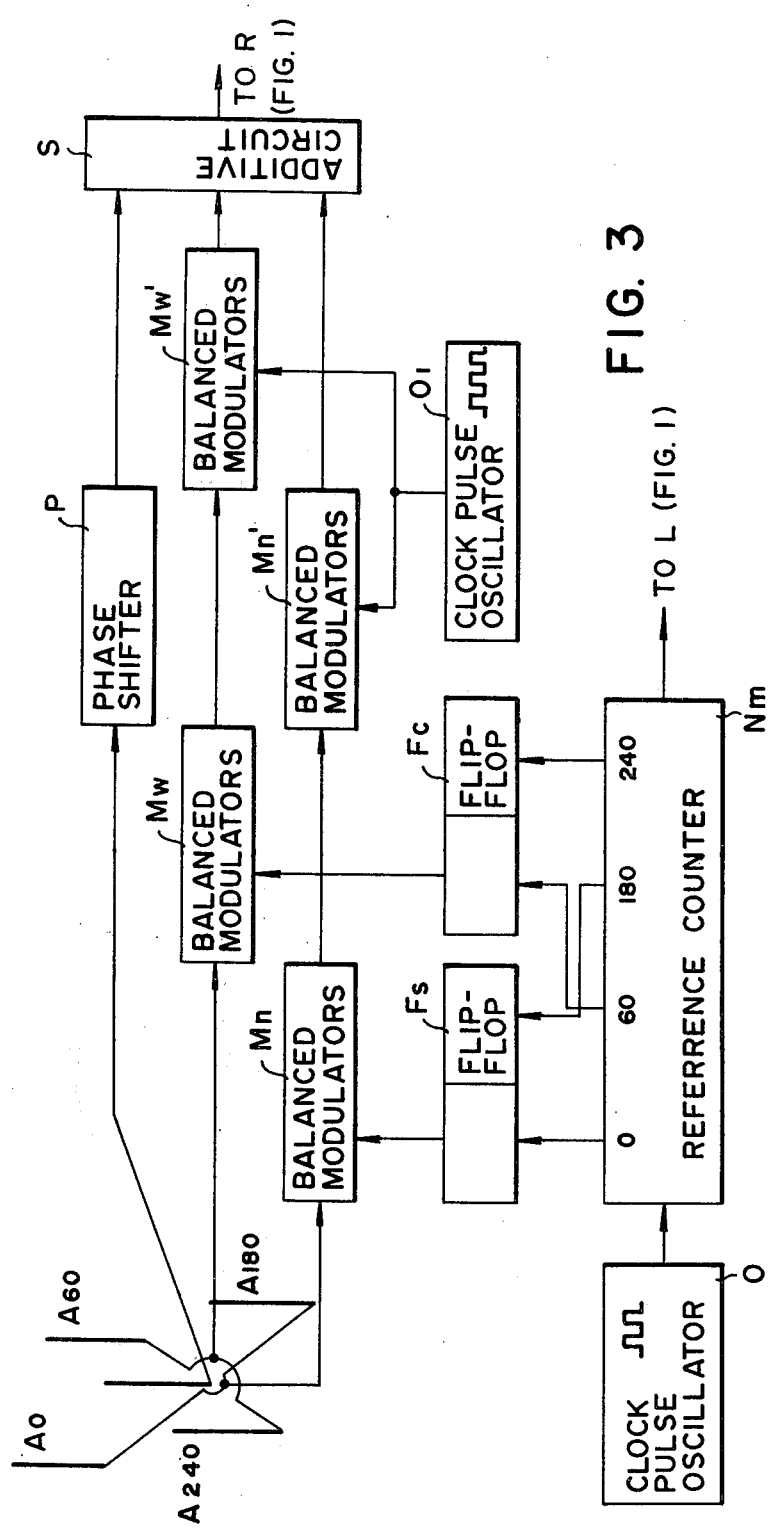

RADIO DIRECTION FINDER

BACKGROUND OF THE INVENTION

1. Field of the Invention

This invention relates to radio direction finders used particularly for ships, vehicles and aircrafts.

2. Description of the Prior Art.

The radio direction finders of the prior art include those in which a directional antenna itself, or a goniometer to which the output of the directional antenna is connected, is rotated, and the output thereof is combined with the output of a nondirectional antenna for the display of the direction of arrival of a radio wave, by means of a pointer reading on a direction-finder-bearing indicator, or by an image on a cathode-ray tube.

A method of rotating the antenna or goniometer by electric means is disclosed in, for instance, Japanese Patent Publication No. 42674/52, published on Oct. 26, 1977.

FIG. 1 in the aforementioned Japanese Patent Publication shows directional antennas 1 and 2, an antenna coupler 3, an electronic switch 4, a nondirectional antenna 5, a phase shifter 6 and a coupler 7. In this disclosed system, primary coils $L_{01}$ to $L_{08}$ and secondary coils $L_1$ to $L_8$ of the coupler 3 form a commonly termed electronic goniometer which is associated with the electronic switch 4 which, in turn, switches the outputs of these coils. With this mechanism, an output, for practical purposes, similar to that of a rotatable goniometer is obtained.

When antennas are installed in a locality surrounded by many nearby structures, as in ships, vehicles and aircrafts, or when Adcock antennas are used as directional antennas, a peculiar error determined by the construction and condition of installation of the antennas is produced due to the span of the antenna. Usually, the error is corrected mechanically or by inserting an attenuator in the directional antenna circuit.

SUMMARY OF THE INVENTION

The invention comprises a radio direction finder, in which there is provided an oscillator for producing a plurality of AC signals, each having a phase angle corresponding to the configuration of each of a plurality of directional antennas. The outputs of the directional antennas are modulated with the respective AC signals. The modulated outputs (thus obtained) are added with the output of a nondirectional antenna, having a suitable phase, to produce a resultant output coupled to a receiver. The phase of the output of the receiver is automatically tracked and displayed on a display unit, thereby displaying the direction of arrival of the intercepted wave in terms of numerical figures.

Other features of the radio direction finder according to the invention are as follows:

(a) An odd number of directional antennas can be employed.

(b) A plurality of directional antennas can be arranged at desired angles relative to one another, and it is possible to simply adjust the phase of the output of an oscillator on the basis of the configuration of a plurality of directional antennas.

(c) Speedy or accelerated automatic phase tracking can be achieved.

(d) The automatic phase tracking procedure can be stopped when an interference wave is combined with a weak relevant wave, or when static is encountered, and the procedure can be resumed immediately after the disappearance of such disturbance.

(e) A peculiar error determined by the condition of installation of the antennas can be automatically corrected.

Accordingly, it is an object of the present invention to provide a radio direction finder, wherein a bearing signal is obtained in a purely electrical manner, and wherein it is possible to achieve automatic correction of bearing error without utilization of any rotating mechanism, switching circuit, or attenuator.

It is a further object of the present invention to provide a radio direction finder, with which an odd number of directional antennas can be employed.

It is a further object of the present invention to provide a radio direction finder, with which a plurality of directional antennas can be arranged at non-uniform spacing and at desired angles relative to one another, and it is possible to simply adjust the phase of the output of an oscillator on the basis of the configuration of a plurality of directional antennas.

It is a further object of the present invention to provide a radio direction finder having the capability of speedy or accelerated automatic phase tracking.

It is a further object of the present invention to provide a radio direction finder, wherein the automatic phase tracking procedure can be stopped when an interference wave is encountered, and wherein the automatic phase tracking produce can be resumed immediately after the disappearance of such disturbance.

Finally, it is a further object of the present invention to provide a radio direction finder, wherein a peculiar error determined by the condition of installation of the antennas can be automatically corrected.

With the above and other objects in view, that will hereinafter appear, the nature of the invention will be more clearly understood by reference to the following description, the appended claims, and the accompanying drawings.

BRIEF DESCRIPTION OF THE DRAWINGS

FIG. 3 is a block diagram showing another embodiment of the invention, wherein directional antennas are not arranged at an equal angle, and wherein the antenna outputs are further modulated with the output of a second oscillator;

DETAILED DESCRIPTION

Figure 1:
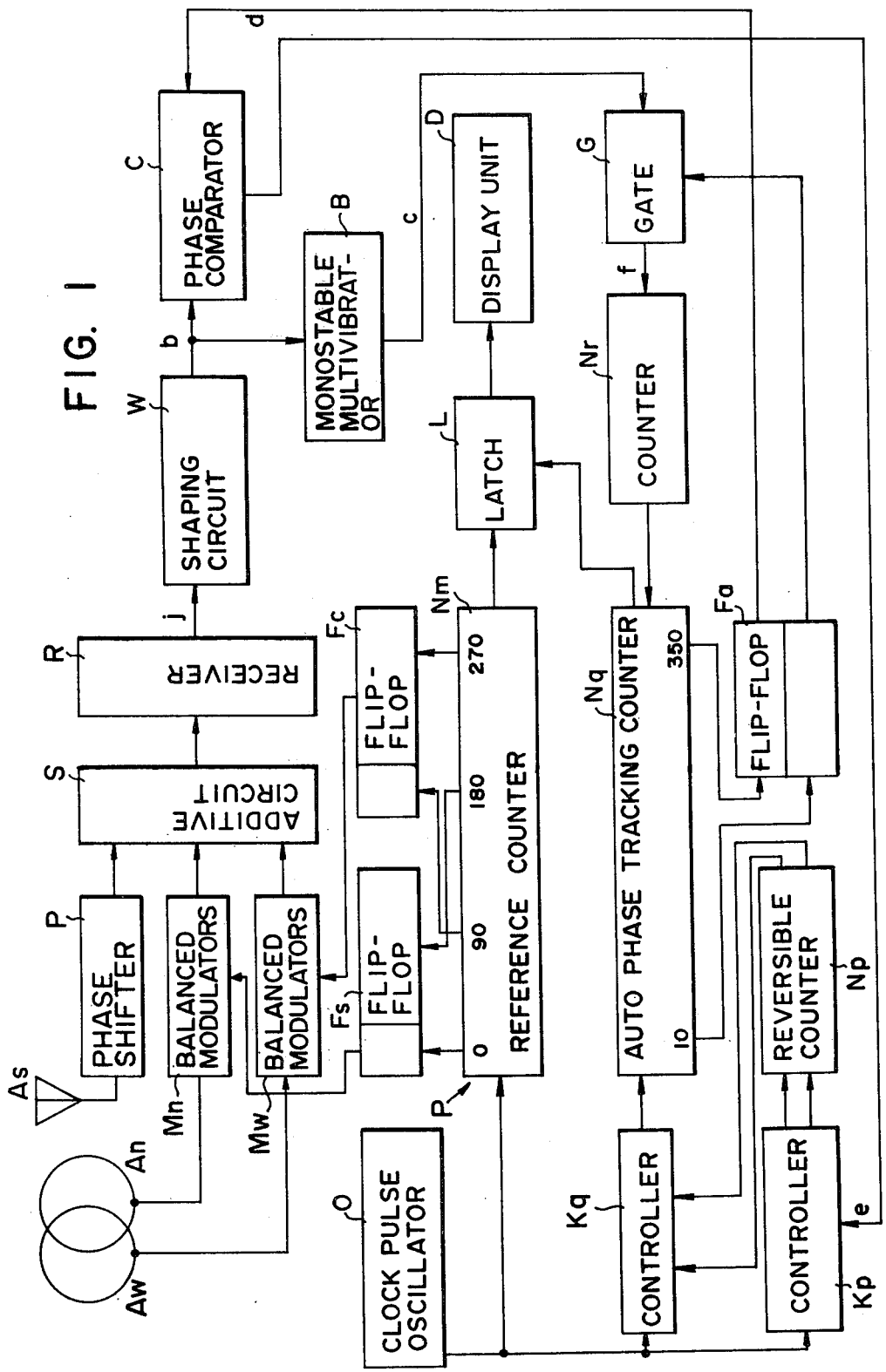
FIG. 1 is a block diagram showing an embodiment of the radio direction finder according to the invention.

Referring now to FIG. 1, which is a block diagram of one embodiment of the invention, a pair of loop antennas $A_w$ and $A_n$ are arranged perpendicular to each other, and their outputs are coupled to respective balanced modulators $M_w$ and $M_n$. A reference counter $N_m$ repeatedly counts output pulses of a clock pulse generator O. Counter $N_m$ has a full scale of 360, and the outputs of flip-flop circuits $F_s$ and $F_c$, which are driven by signals transmitted to them from the reference counter $N_m$ when the count thereof is 0 and 180 and 90 and 270, respectively, are coupled to the modulators $M_n$ and $M_w$, respectively. The outputs of these modulators and a phase-shifted output of a sense antenna $A_s$ (provided by phase shifter P) are combined by additive circuit S, the output of which is coupled to a receiver R. The angular frequency corresponding to the inverse of the counting period of the counter $N_m$, that is, the period required for counting 360 clock pulses, is designated by $\rho$. The flip-flop circuits $F_s$ and $F_c$ transmit rectangular waves having fundamental waves defined by $\sin \rho t$ and $\cos \rho t$, respectively. Assuming that a radio wave of an intensity $E_o$ appears in a direction of angle $\theta$ with respect to the axis of the antenna $A_n$, the outputs $E_n$ and $E_w$ of the modulators $M_n$ and $M_w$, respectively, are:

$$E_n = E_O \cos \theta \sin \rho t \tag{1}$$

$$E_w = E_O \sin \theta \cos \rho t \tag{2}$$

The resultant output E is $$E = E_n + E_w = E_O \sin (\rho t + \theta) \tag{3}$$

This output is combined with the output of the nondirectional antenna $A_s$, and the resultant signal is coupled to the receiver R. Thus, the output e obtained in the receiver R is $$e = K \sin (\rho t + \theta) \tag{4}$$

where K is a value determined by the sensitivity of the receiver R. In other words, the receiver R provides a signal with a phase angle $\theta$ (coinciding with the direction of arrival of the wave) and with angular frequency corresponding to the inverse of the period of purely electric rotation of the directivity of the antennas as given by equation (4). This output is coupled to a shaping circuit W for conversion into a rectangular wave, which is shown in b in FIG. 2, the reference signal $E_O \sin \rho t$ being shown in a of FIG. 2.

The clock pulses from clock pulse generator O are used to operate phase tracking system P. Specifically, the clock pulses are coupled through a controller $K_q$ to an automatic phase tracking counter $N_q$ which has a full scale of 360, and signals transmitted from the counter $N_q$ when the count thereof becomes 10 and 350 are used to drive a flip-flop circuit $F_a$. The circuit $F_a$ thus produces an output such as shown in $d_1$ in FIG. 2 from one of its output terminals, and this output and the output b of the shaping circuit W are provided to a phase comparator C. The comparator C comprises an exclusive OR circuit, and produces an output such as shown in $e_1$ in FIG. 2 for controlling the controller $K_p$. Through this controller $K_p$ the output of the clock pulse generator O is coupled to a reversible counter $N_p$, which produces a carry or barrow signal for controlling the controller $K_q$. The controller $K_p$ couples a pulse to an "addition" input terminal of the reversible counter $N_p$ when the output e of the comparator C has a high level, and couples a pulse to a "subtraction" input terminal of the counter $N_p$ when the output e has a low level. When the controller $K_q$ receives a carry signal from the counter $N_p$, it inserts an additional pulse in the gap between adjacent input pulses, while reception of a borrow signal causes counter $N_p$ to block the next input pulse. When the high level and low level portions of the output signal of the comparactor C have equal time durations, as shown in $e_1$ of FIG. 2, the reversible counter $N_p$ does not produce a carry or borrow signal, so that the counter $N_q$ is held in the balanced state. However, when the output signal of the flip-flop circuit $F_a$ is delayed with respect to the output signal b of the shaping circuit W, as shown in $d_2$ of FIG. 2, the high level portion of the output signal of the comparator C has a greater time duration than the low level portion, as shown in $e_2$. When this state is continued for a considerable period of time, the counter $N_p$ produces a carry signal, so that an additional pulse is coupled to the counter $N_q$ to temporarily increase the counting rate. As a result, the output signal $d_2$ of the flip-flop circuit $F_a$ is advanced in phase, and the counter $N_q$ is stabilized in the aforementioned balanced state. It is to be understood that, in the above operation, the output signal of the receiver R is always tracked by the counting operation of the counter $N_q$. While the tracking is stably carried out with the integrating action of the reversible counter $N_p$, a considerable delay is produced in the response.

Figure 2:
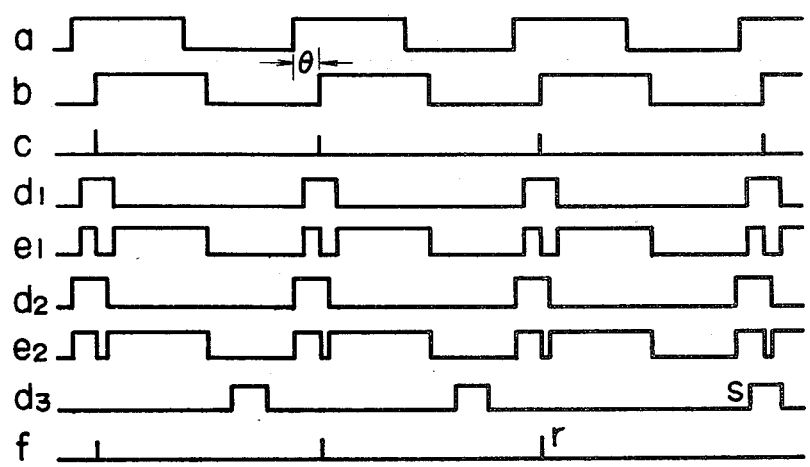
FIG. 2 is a timing chart illustrating the operation of the embodiment of FIG. 1.

With the above in mind, the system of FIG. 1 includes a monostable multivibrator B which is driven with the output b of the shaping circuit W to produce pulses which are narrow in time width as shown in c in FIG. 2. These pulses are coupled through a gate circuit G, which is controlled by the output from the other output terminal of the flip-flop circuit $F_a$, to a counter $N_r$ so as to cause counter $N_r$ to produce a carry signal for resetting automatic phase tracking counter $N_q$. When a wave is received after it has been interrupted for a considerably long period of time, the phase relation between the output b of the shaping circuit W (and hence the pulse signal c) and the output d of the flip-flop circuit $F_a$ is absolutely indefinite; that is, the output d is usually as shown in $d_2$ in FIG. 2, and does not coincide with the pulse signal c. Thus, by opening the gate circuit G with the output of the other output terminal of the flip-flop circuit $F_a$, input pulses are coupled to the counter $N_r$ so long as the pulse signal c and the output d do not coincide with each other, as mentioned above. The counter $N_r$ counts these input pulses f, and upon reaching a constant number, counter $N_r$ produces a carry signal simultaneously with the last pulse r to reset the tracking counter $N_q$. Consequently, the following output d comes to coincide with the pulse c, as shown at s in $d_3$ in FIG. 2, thus once again bringing about the aforementioned automatic phase tracking state.

Since the automatic phase tracking counter $N_q$ is adapted to repeat counting of clock pulses in synchronisation with the output signal of the receiver R, as described above, the count of the reference counter $N_m$ is memorized by driving a memory, such as latch circuit L, with a carry signal from the counter $N_q$ while also providing a display on display unit D. The displayed value indicates the phase angle $\theta$ of the output b, that is, the direction of arrival of the wave.

In case of Adcock antennas, or the like, where an opposite relation between error and sensitivity exists between received frequency and span, a four pairs of antennas may be arranged at an angle of 45 degrees with respect to each other because of decreasing the error. Even in such a case, modulation of the outputs of the four pairs of antennas with modulating waves sin ρt, cos ρt, sin (ρt+π/4) and cos (ρt+π/4) yields respective outputs $E_n$, $E_w$, $E(n-\pi/4)$ and $E(n-\pi/4)$ given as $$E_n = E_O \cos\theta \sin\rho t,$$

$$E_w = E_O \sin\theta \cos\rho t,$$

$$E(n-\pi/4) = E_O \cos(\theta-\pi/4)\sin(\rho t+\pi/4)$$

and $$E(w-\pi/4) = E_O \sin(\theta-\pi/4)\cos(\rho t+\pi/4).$$

Thus, the resultant E of these outputs is $$E = E_n + E_w + E_{(n-\pi/4)} + E_{(w-\pi/4)} = 2E_O \sin(\rho t + \theta).$$

Thus, it is seen that the direction of arrival of the wave can be known by obtaining the phase angle $\theta$ of the same demodulated output.

FIG. 3 shows a modification of the above-described embodiment. A second clock pulse generator (oscillator) $O_1$ having a frequency higher than that of clock pulse generator (oscillator) O is provided. The output of oscillator $O_1$ is modulated, by balanced modulation in modulators $M_m'$ and $M_w'$, with modulating waves obtained from the arrangement of oscillator O, reference counter $N_m$, and flip-flops $F_s$ and $F_c$, which has previously been used to modulate the outputs of the directional antennas $A_w$ and $A_n$ by balanced modulation. The resultant outputs of modulators $M_m'$ and $M_w'$ are coupled to the additive circuit S wherein they are combined with the output of phase shifter P as in the embodiment of FIG. 1, the output of additive circuit S being provided to receiver R (FIG. 1). Since a signal produced by modulating the output of the second oscillator $O_1$ with the output of the oscillator O is obtained as the demodulation output of the receiver R, the output of the second oscillator is superimposed on this signal in a suitable phase relation thereto for detection so as to derive a signal similar to that of equation 4 mentioned previously. In this system, the frequency of the oscillator 0 is set to a low frequency of the order of 100 Hz, and the frequency of the second oscillator $O_1$ is set to a value such that amplification and demodulation can be effectively accomplished with an ordinary communication receiver.

While the description so far is concerned with the use of a pair or plural pairs of directional antennas, with the antennas in each pair perpendicular to each other, it is obviously possble to employ an odd number of antennas as each set, to arrange the antennas in each set at a desired angle other than right angles with respect to one another, and to make purely electric correction of the error due to the condition of installation of the antennas.

Figure 4:
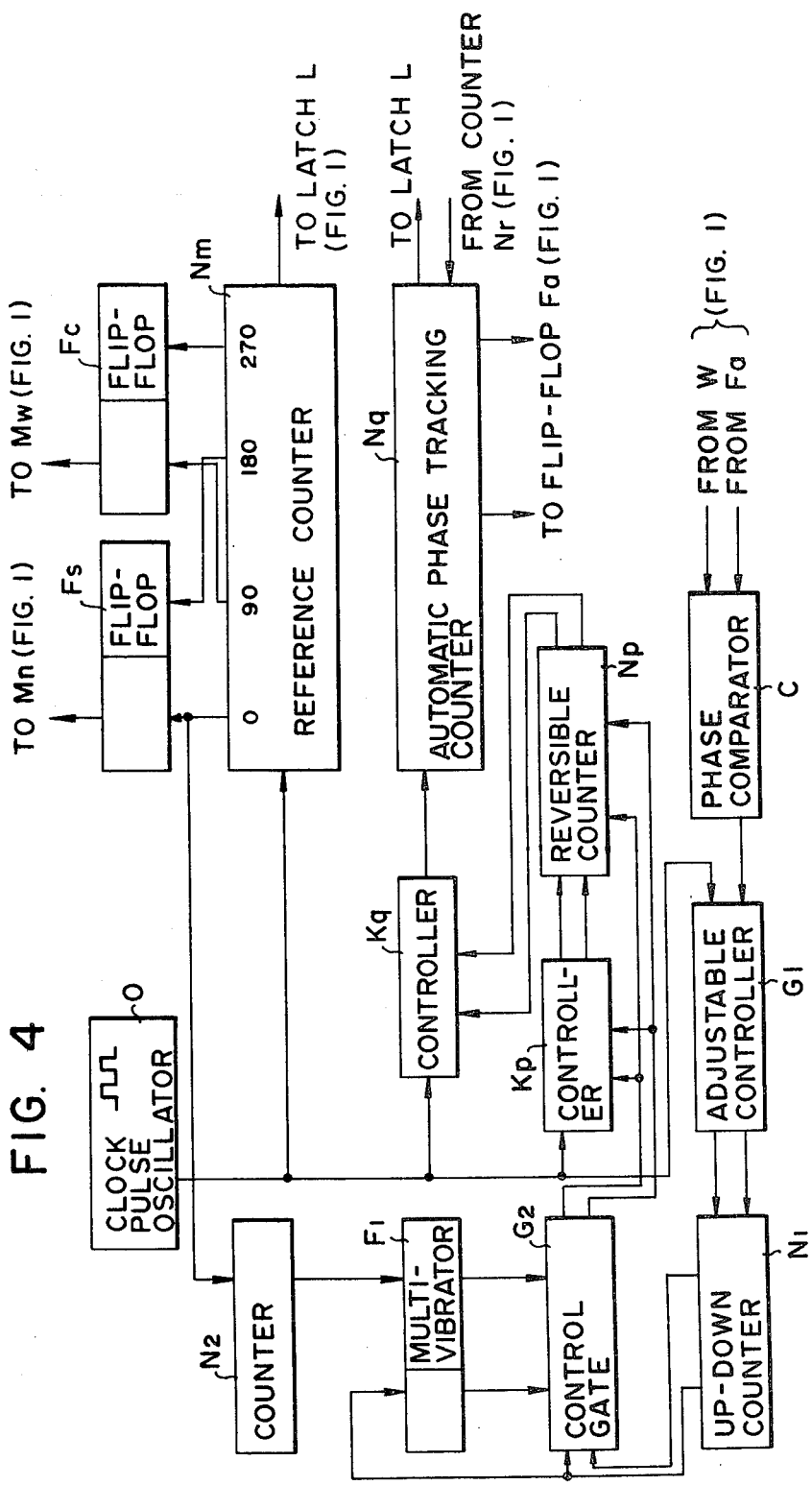
FIG. 4 is a block diagram showing a further embodiment of the invention, wherein a automatic phase tracking is effected at a higher rate than the case of the embodiment of FIG. 1.

FIG. 4 shows a further embodiment, in which the aforementioned automatic phase tracking is further specified. An adjustable controller $G_1$ is operated with the positive or negative output of a phase comparator C (corresponding to comparator C of FIG. 1) so as to cause an up-down counter $N_1$ to count in the positive or negative direction for transmitting a count output.

One of the outputs of the up-down counter $N_1$ is directly coupled to a control gate $G_2$, while the other output is coupled to a flip-flop $F_1$. The other input to the flip-flop $F_1$ is coupled to the output of a counter $N_2$, which produces an overflow pulse by counting a predetermined number of pulses transmitted for each cycle of reference counter $N_m$. The two outputs of flip-flop $F_1$ are coupled to control gate $G_2$.

The output of control gate $G_2$ operates a circuit comprising controller $K_p$ and reversible counter $N_p$ such that, when the phase difference detected by phase comparator C is large, the count output of counter $N_p$ is transmitted to controller $K_q$ to control the aforementioned automatic phase tracking counter $N_q$ until it reaches (for instance) one-tenth the count, at which time the phase difference is small. Thus, since—when the phase difference is large—the reference point of control of the automatic tracking phase counter $N_q$ is advanced, it is possible to more quickly complete the automatic phase tracking operation.

Figure 5:
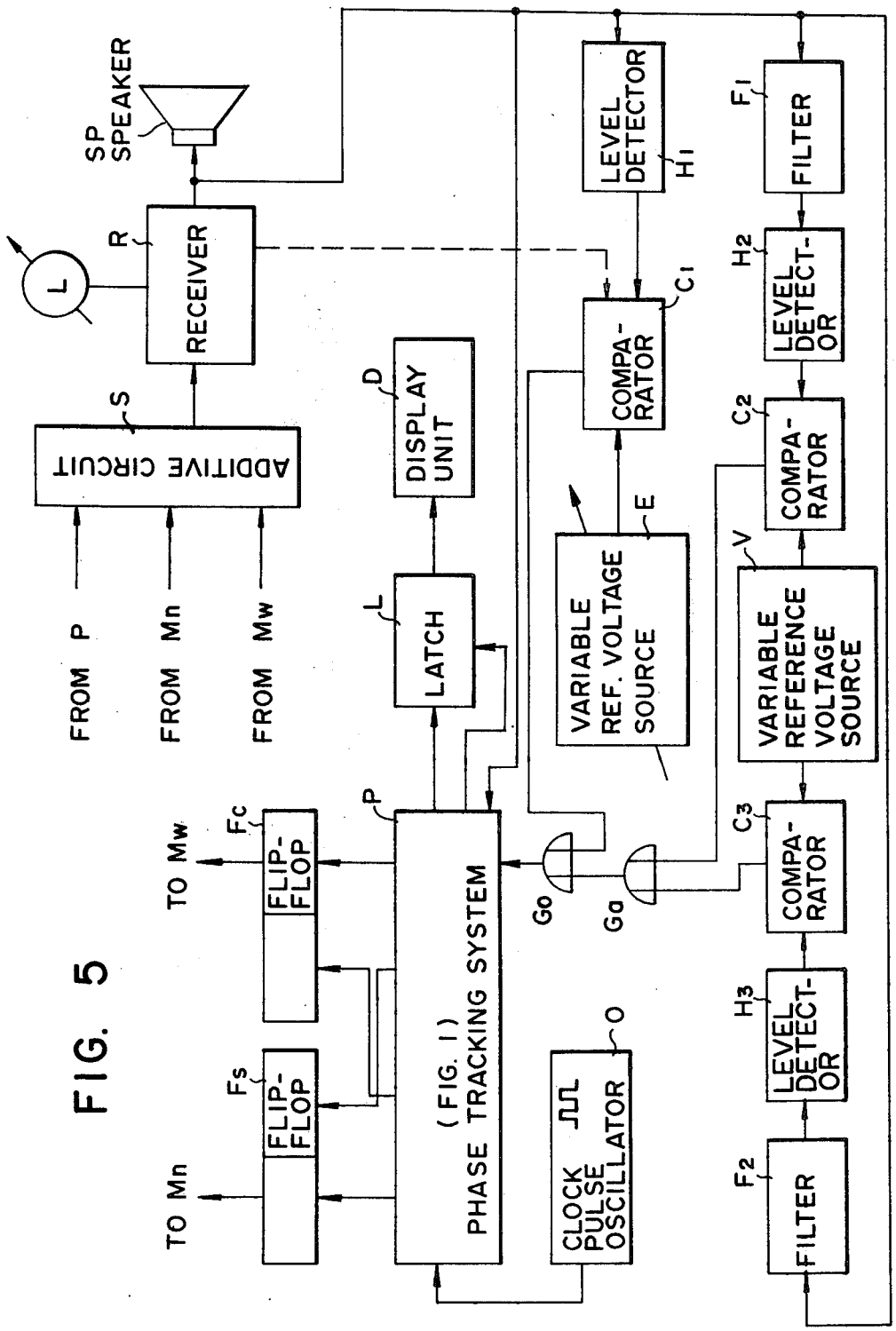
FIG. 5 is a block diagram showing a still further embodiment of the invention, wherein the automatic phase tracking is stopped when there are interference waves of higher intensity, or when there is strong disturbance by static, and automatic phase tracking is resumed when the relevant low level waves only are received.

FIG. 5 shows a still further embodiment of the radio direction finder. In this embodiment, the aforementioned automatic phase tracking procedure is stopped when an interference wave of higher intensity than the relevant wave for measurement of the bearing is received, or when static is encountered. The procedure is resumed for determination of the bearing of the relevant wave when the intense wave or static disappears.

In FIG. 5, the output of a receiver R is coupled to a level detector $H_1$ which produces a DC voltage corresponding to the receiver output level. This DC voltage and the output voltage of a variable reference voltage source E are compared in comparator $C_1$. When the output voltage of the level detector $H_1$ is higher than the reference voltage E, the comparator $C_1$ produces a signal which is coupled through an OR gate $G_o$ to the aforementioned phase tracking system P (that is, reference counter $N_m$) to stop the operation of the system. At this time, it is also possible to directly couple an automatic gain control (AGC) or automatic volume control (AVC) voltage, typically found in conventional receivers, to the comparator $C_1$, as shown by dashed line from receiver R to comparator $C_1$.

Further, the output of the receiver is coupled to level detectors $H_2$ and $H_3$ through respective 200-Hz and 500-Hz filters $F_1$ and $F_2$. Thus, when receiver output is higher than the variable reference voltage V, the outputs of the comparators $C_2$ and $C_3$ are coupled through AND gate $G_a$ and OR gate $G_o$ to stop the phase tracking procedure in a manner similar to that mentioned above. This circuit is provided for the case when a static is encountered. The static is accompanied by noise covering a wide frequency range, and this circuit is intended to derive a frequency which is not in a harmonic relation to the relevant frequency. Thus, in the presence of an intense wave or static, as mentioned above, the phase tracking and display of the bearing are ceased, and immediately after the disappearance of the disturbance, the phase tracking is resumed to determine and display the direction of arrival of the weak wave.

Figure 7:
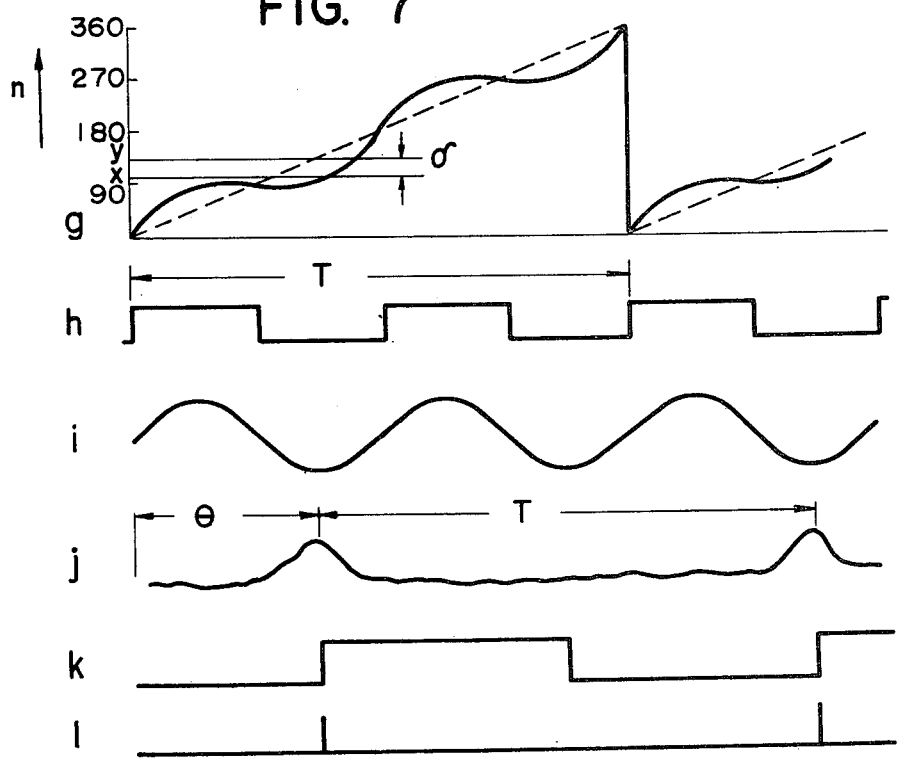
FIG. 7 is a timing chart illustrating the operation of the embodiment of FIG. 6.
Figure 6:
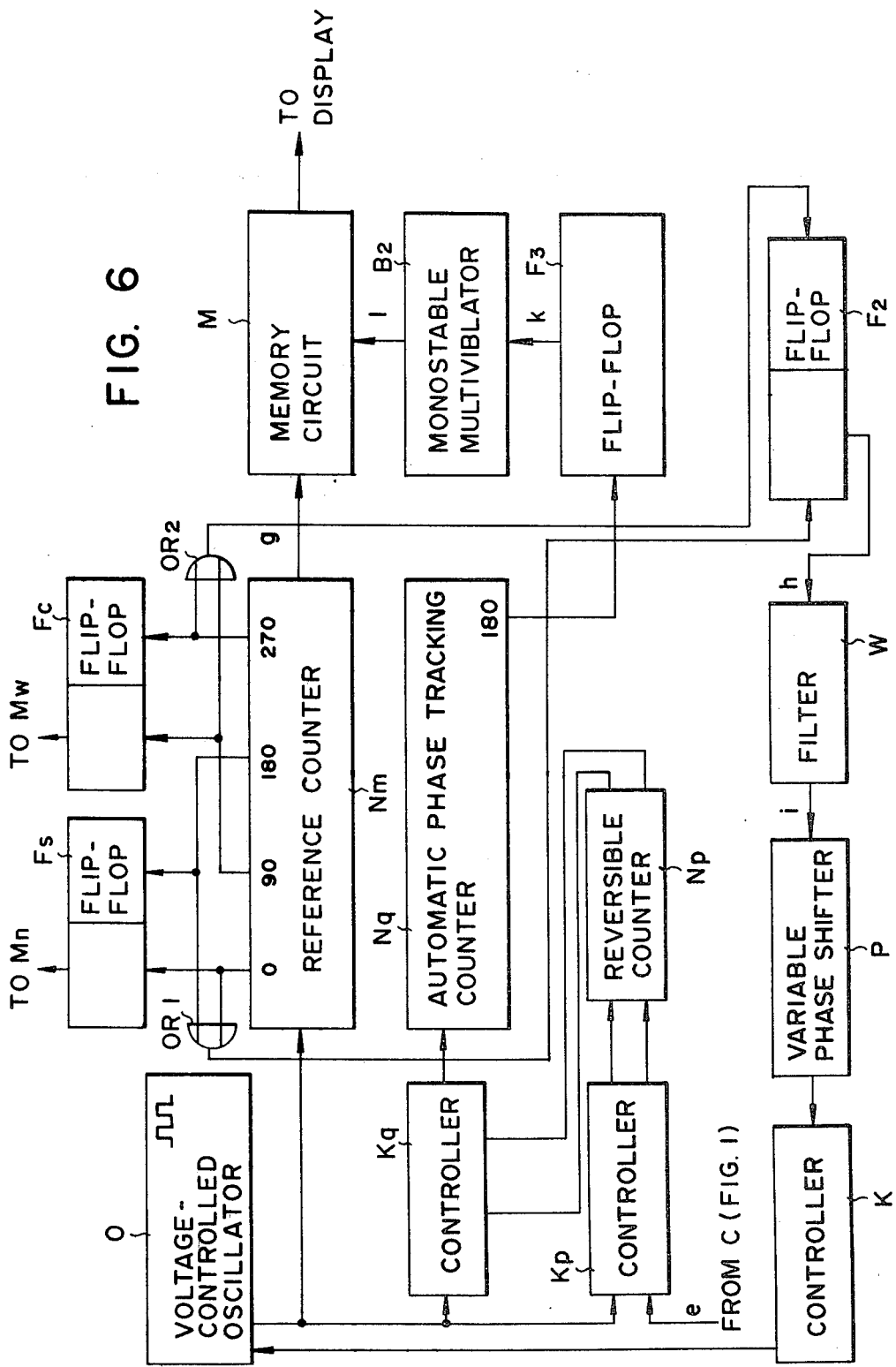
FIG. 6 is a block diagram showing still another embodiment of the invention, which automatically corrects a peculiar error attributable to the condition of installation, and the like, of the directional antennas.

FIG. 6 shows a yet further embodiment, in which quadrantal error is automatically corrected, and FIG. 7 is a timing chart illustrating the operation of the embodiment of FIG. 6.

While the aforementioned reference counter $N_m$ of FIG. 1 produces a count output according to the direction of arrival of the wave as shown by dashed line g in FIG. 7, in the instant embodiment of FIG. 6, a count output as shown by a solid curve is produced. When the count of the reference counter $N_m$ is 0 and 180, OR gate $OR_1$ provides an input to one of the input terminals of a flip-flop $F_2$; when the count is 90 and 270, another OR gate $OR_2$ provides an input to the other input terminal of the flip-flop $F_2$. The flip-flop $F_2$ produces an output as shown in h in FIG. 7, which output is passed through a filter W to obtain a sinusoldal wave i, which in turn is coupled through a variable phase shifter P (capable of phase shifting by 90°) to a controller K. The controller K produces an output for controlling a voltage-controlled oscillator so as to determine the extent of the error correction depending upon the degree of the aforementioned quadrantal error.

Thus, if the output of the receiver R is as shown in j in FIG. 7, a flip-flop $F_3$—operated by the output of phase tracking counter $N_q$—transmits a pulse every time 180 clock (oscillator) pulses are counted, and thus produces an output k to operate a monostable multivibrator $B_2$, the output l of which in turn drives the memory circuit M (for example, aforementioned latch L and display D of FIG. 1) for displaying the count value of the reference counter $N_m$, that is, a value on the solid curve h in FIG. 7.

While the instant embodiment has been concerned with the correction of the quadrantal error, other errors peculiar to given conditions of antenna installation—for instance half, sextantal and octantal errors—may also be automatically corrected by appropriately selecting the output terminal number and count value of the aforementioned reference counter $N_m$, selecting the extent of phase shift by the phase shifter P, and setting the proper extent of correction by the controller K. Further, it is possible to correct such errors on a compounded basis.

As has been described in the foregoing, with the radio direction finder according to the invention it is possible to obtain an output related to the bearing without rotating directional antennas themselves or a goniometer connected to the antennas, and without switching a number of coils or high frequency transformers provided among the directional antennas, but rather with a simple construction. In addition, the plurality of directional antennas used are not necessarily even in number. Further it is possible to install the antennas at desired angles, and simply to make correction with respect to the resultant angle by a purely electrical technique or method. Furthermore, automatic determination of the bearing of even weak waves can be obtained by accelerating the automatic phase tracking procedure. Still further, it is possible to automatically correct peculiar errors due to the construction and condition of installation of the antennas. Moreover, while—in the case of using Adcock antennas—the span affects the magnitude of the octant error in proportion to the wavelength, the correction can be simply made, thus permitting extension of the frequency range of reception.

While preferred forms and arrangements have been shown in illustrating the invention, it is to be clearly understood that various changes in detail and arrangement may be made without departing from the spirit and scope of this disclosure.

What we claim is:

1. A radio direction finder for determining the bearing of received radio wave, comprising:

a nondirectional antenna having an output;
    a plurality of directional antennas having a directivity and respective outputs;
    an oscillator means for producing AC signals, each having a phase angle corresponding to the configuration of each of said directional antennas and including reference oscillator means for producing output pulses, reference counter means for counting said output pulses from said reference oscillator means to produce count outputs, and flip-flop means for receiving the count outputs of said reference count means, said flip-flop means being responsive to said count outputs of said modulator means for causing said modulator means to modulate the respective outputs of said directional antennas in accordance therewith;
    modulator means for modulating the respective outputs of said directional antennas with said respective AC signals to derive respective modulation outputs;
    phase-shifting means for phase-shifting the output of said nondirectional antenna to produce a phase-shifted output thereof;
    additive means for superimposing the respective modulation outputs of said modulator means on said phase-shifted output of said nondirectional antenna to develop a synthesized output;
    receiving circuit means for demodulating said synthesized output of said synthesizing means to recover said AC signals, and producing an output having a phase;
    tracking circuit means for automatically tracking the phase of the output of said receiving circuit means so as to derive the bearing of the received radio wave; and
    display means for displaying the bearing of the received radio wave numerically.

2. The radio direction finder according to claim 1, wherein said tracking circuit means for automatically tracking the phase of the output of said receiving circuit means includes an automatic phase tracking counter having an output, said radio direction finder further comprising phase comparator means for receiving an phase-comparing the output of said receiving circuit means and the output of said automatic phase tracking counter to develop alternative outputs in accordance with said phase-comparing, controller means responsive to the alternative outputs of said phase comparator means for issuing control signals, up-down counter means for counting in accordance with the output of said oscillator under the control of said control signals from said controller means to provide a controlling counter output, said automatic phase tracking counter being controlled by the controlling counter output of said reversible counter, and latch circuit means for memorizing the count output of said reference ring counter means under the control of the output of said automatic phase tracking counter.

3. The radio direction finder according to claim 1, wherein said circuit means for automatically tracking the phase of the output of said receiving circuit means includes an automatic phase tracking counter having an output, said radio direction finder further comprising a reset circuit including detecting means for detecting a predetermined relation between the period of counting of said automatic phase tracking counter and the output signal from said receiving circuit to produce a detection signal, and counter means responsive to said detection signal from said detecting means for counting to a predetermined number so long as said detection signal is produced so as to produce a reset output, said automatic phase tracking counter being responsive to said reset output from said counter means to start counting.

4. The radio direction finder according to claim 1, wherein said circuit means for automatically tracking the phase of the output of said receiving circuit includes an automatic phase tracking counter having an output, said radio direction finder further comprising phase comparator means for receiving and phase-comparing the output of said receiving circuit means and the output of said automatic phase tracking counter to develop alternative outputs in accordance with said phase-comparing, a counter for counting the output of said reference counter produced for every cycle thereof, an up-down counter controlled by the alternative outputs of said phase comparator means, a flip-flop operated by the outputs of said counter and said up-down counter, and a control quantity switch for controlling the output of said up-down counter with the output said flip-flop, whereby to effect multi-speed phase control.

5. The radio direction finder according to claim 1, further comprising a level detector circuit for producing a signal corresponding to the output of said receiving circuit, a comparator for receiving and comparing the output of said level detector circuit and a reference voltage to provide a comparison output, and a control circuit for selectively operating or halting operation of said following circuit means in accordance with the comparison output of said comparator.

6. The radio direction finder according to claim 1, wherein said oscillator operates at a given frequency, further comprising an additional oscillator for producing output pulses at a frequency higher than said given frequency of said oscillator, additional modulator means for modulating the output pulses of said additional oscillator with the modulation outputs of said modulator means to produce resultant modulated outputs, and means for providing said resultant modulated outputs to said synthesizing means for superimposition on said phase-shifted output of said nondirectional antenna.

7. The radio direction finder according to claim 1, further providing error correcting means comprising a flip-flop receiving a plurality of count outputs of said reference counter respectively corresponding to said phase angles, the output of said flip-flop being used to control the number of pulses counted by said reference counter.

* * * * *